United States Patent [19]

Borzym

[11] Patent Number: 4,542,670
[45] Date of Patent: Sep. 24, 1985

[54] CUTOFF DIE SET SEAT ACCELERATOR USING ROTARY TO LINEAR MOTION CONVERTER

[76] Inventor: John J. Borzym, 4820 Schoolbell, Birmingham, Mich. 48010

[21] Appl. No.: 498,982

[22] Filed: May 27, 1983

[51] Int. Cl.³ .................... B23D 25/06; B23D 21/00
[52] U.S. Cl. ...................................... 83/295; 83/318; 83/319; 83/320; 74/25
[58] Field of Search .............. 83/295, 318, 319, 320; 74/25; 104/166

[56] References Cited

U.S. PATENT DOCUMENTS

| | | | |
|---|---|---|---|
| 3,288,011 | 11/1966 | Borzym | 83/319 X |
| 3,377,900 | 4/1968 | Baker | 83/319 X |
| 3,394,599 | 7/1968 | Tucker | 74/25 |
| 3,425,284 | 2/1969 | Shelton | 74/25 |
| 3,460,421 | 8/1969 | Borzym | 83/318 X |
| 3,566,728 | 3/1971 | Ohmasu | 83/319 X |
| 3,861,322 | 1/1975 | Danly | 104/166 |
| 3,886,831 | 6/1975 | Law et al. | 83/319 X |
| 3,919,906 | 11/1975 | Law | 83/319 X |
| 4,354,409 | 10/1982 | Riera et al. | 83/319 X |
| 4,411,182 | 10/1983 | Borzym | 83/319 |

Primary Examiner—Donald R. Schran
Attorney, Agent, or Firm—Krass & Young

[57] ABSTRACT

A flying cutoff system for tubing and the like wherein a cutting die mechanism (46) is driven by a threadless shaft (36) and traveler assembly (44) powered by a reversible DC motor (40). Die set position relative to the press is accurately monitored even in the presence of slip in the drive.

11 Claims, 4 Drawing Figures

CUTOFF DIE SET SEAT ACCELERATOR USING ROTARY TO LINEAR MOTION CONVERTER

INTRODUCTION

This invention relates to flying cutoff apparatus for products such as tubing and roll-formed articles which are manufactured in a substantially continuous process which involves longitudinal travel of the product. More particularly, the invention relates to apparatus for precisely controlling the reciprocal movement of a cutoff mechanism relative to an actuating press bed so as to advance synchronously with the work product to be cut in one direction and then reverse to a home position ready for the next cut.

BACKGROUND OF THE INVENTION

Die mechanism accelerators for flying cutoffs are well known. Hydraulic and pneumatic accelerators are typically very complex, bulky, and expensive devices and represent a limiting factor in the reliability of a flying cutoff system. Mechanical accelerators utilizing racks and pinions are also known and, in fact, may be preferred in some applications because of the accuracy with which the position of the die mechanism may be determined from pinion rotation. Mechanical accelerators are also very expensive due to the precision machining requirements and length of the rack. They are also bulky since the rack can be very long and requires a cover of even greater length to stand adjacent the cutoff press.

Linear actuators using rotating shafts and travelers are also known. A threaded shaft, for example, may be driven by a reversible motor to cause linear translation of a "trapped" nut which is mounted on the shaft. The nut may be connected, for example, to a garage door to move the door between opened and closed positions.

A difficulty with mechanical actuators such as the rack and pinion and screw-shaft types described above arises out of the unforgiving nature of the connection betwen the power source and the driven load; i.e., the direct and positive mechanical connection which produces the desirable quality of position-predictability can give rise to calamitous results if an obstruction is encountered by the driven load due to a malfunction in some other area.

Linear actuators using non-threaded shafts are also known. Such devices use a smooth shaft connected to a motor, and a traveler comprising several rollers the axes of which are skewed relative to the shaft axis so that rotation of the shaft causes the traveler to move longitudinally along the shaft. Such devices are generally considered unsuitable for precision applications since the pressure-dependent nature of the roller-shaft contact can give rise to slip under high load conditions.

SUMMARY OF THE INVENTION

According to the present invention, the die mechanism of an operator such as a flying cutoff or stamping machine is reciprocally driven by a mechanical accelerator having none of the disadvantages of prior art accelerators such as high cost, bulkiness, unreliability, and inability to accommodate mechanical obstructions which interfere with the movement of the driven load. In general, the invention involves a marriage of the threadless shaft, linear actuator described above with a workpiece operator so as to actually convert the slip potential of the threadless shaft actuator to advantage while, at the same time, retaining accuracy in the determination of die mechanism position by directly monitoring the die mechanism itself rather than depending exclusively upon the position of a component of the drive system.

In a preferred form, described hereinafter in greater detail, a flying cutoff press comprises a base, usually a weldment defining a bed along which a die mechanism slides, a ram which may be mechanically, hydraulically, pneumatically, or otherwise driven to operate the die, a shaft supported by bearings in the press weldment so as to extend parallel to the bed but more internally of the weldment so as to be protectible such as by partitioning, from the environment of the die mechanism itself, an electric motor for bidirectionally rotating the shaft, a traveler with skewed rollers mounted on the shaft and drivingly connected to the die mechanism, and means for generating a signal representing the absolute position of the die mechanism relative to the bed and controlling the motor therewith.

Figure 1:
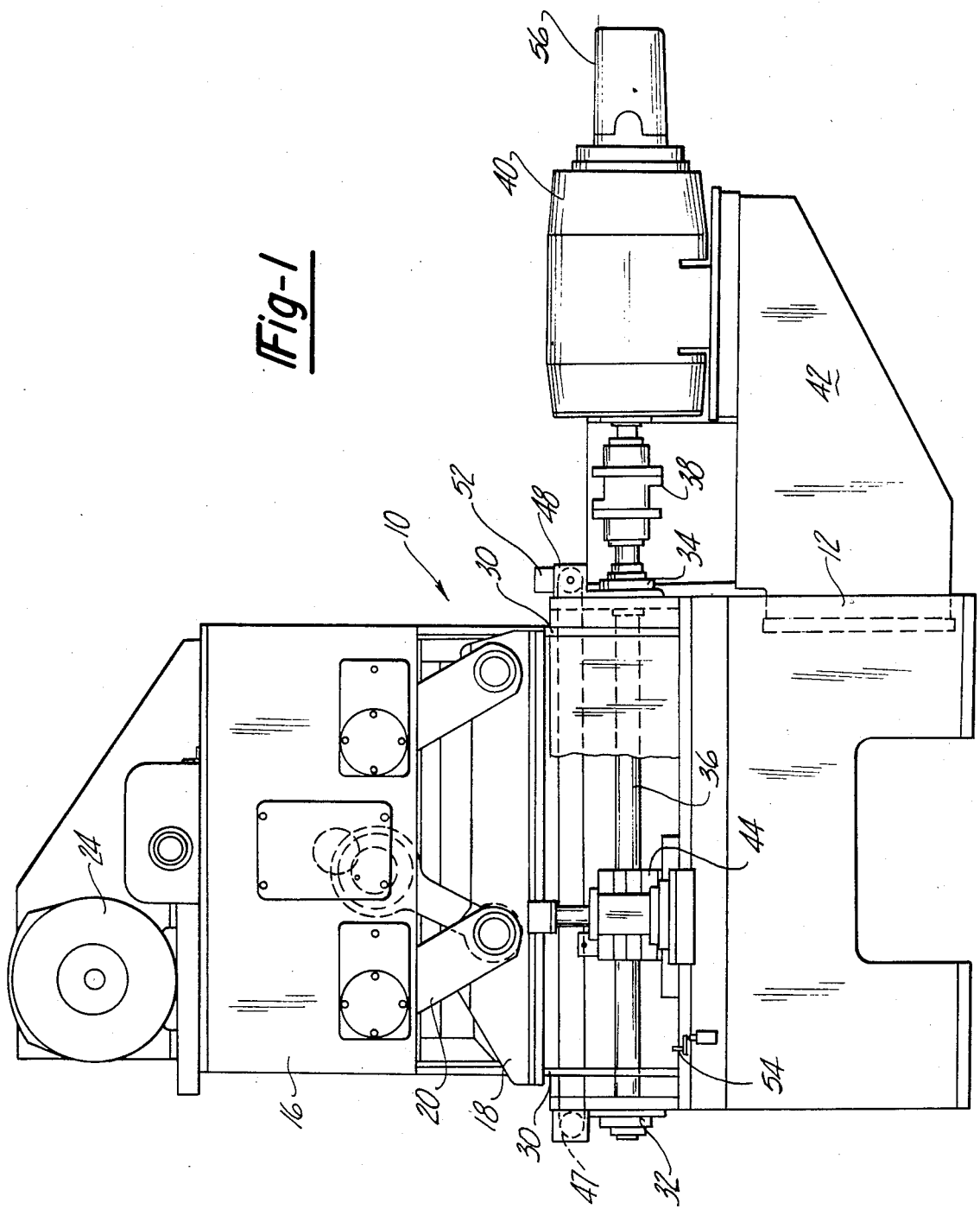
FIG. 1 is a front view of a cutoff assembly for tubing which employs the invention.

As used herein, the term "Die Mechanism" refers to the mechanical arrangement which is actuated by the press ram to travel with, clamp and cut or punch the work product or stock. In the case of tubing, the die mechanism may be single or double cut as is known in the art. In the case of other work products, the clamping function may be eliminated.

DETAILED DESCRIPTION OF SPECIFIC EMBODIMENTS

Referring now to the drawings a cutoff press 10 for tubing, strip material, and/or roll formed articles or "profiles" comprises a heavy rigid base weldment 12 having a bed defined by die slide rails 14 lying in a normally horizontal plane and extending longitudinally of the cutoff press 10. An upper weldment 16 is adapted to carry a ram 18 which overlies the bed rails 14 in vertically spaced parallel relationship. Ram 18 is mounted on pivot arms 20 and 22 which are intermittently driven by a continuously rotating motor 24 through a brake and clutch assembly 26 and a crank arm 28. When so driven, the ram 18 moves in an arcuate path which includes a vertical component carrying the ram 18 toward and away from the rails or slides 14 so as to operate the cutting knife of a die mechanism or die set to cut the tubing or other work product to a desired length.

The mechanical details of the ram and ram driving mechanism are conventional and have been employed in products manufactured and sold by Alpha Industries, Inc. of Novi, Mich., for many years. See for example U.S. Pat. Nos. 3,273,433, 3,288,011, and 3,288,012 to A. Borzym. Similarly the mechanical details of die mechanism per se are also well known and therefore will not be described in detail here. At this point, it shall suffice to say that the die mechanism 46 is mounted between the slides 14 and the ram 18 for movement with and in the direction of the work as it passes through the press 10, and for reverse movement to a starting position.

Figure 2:
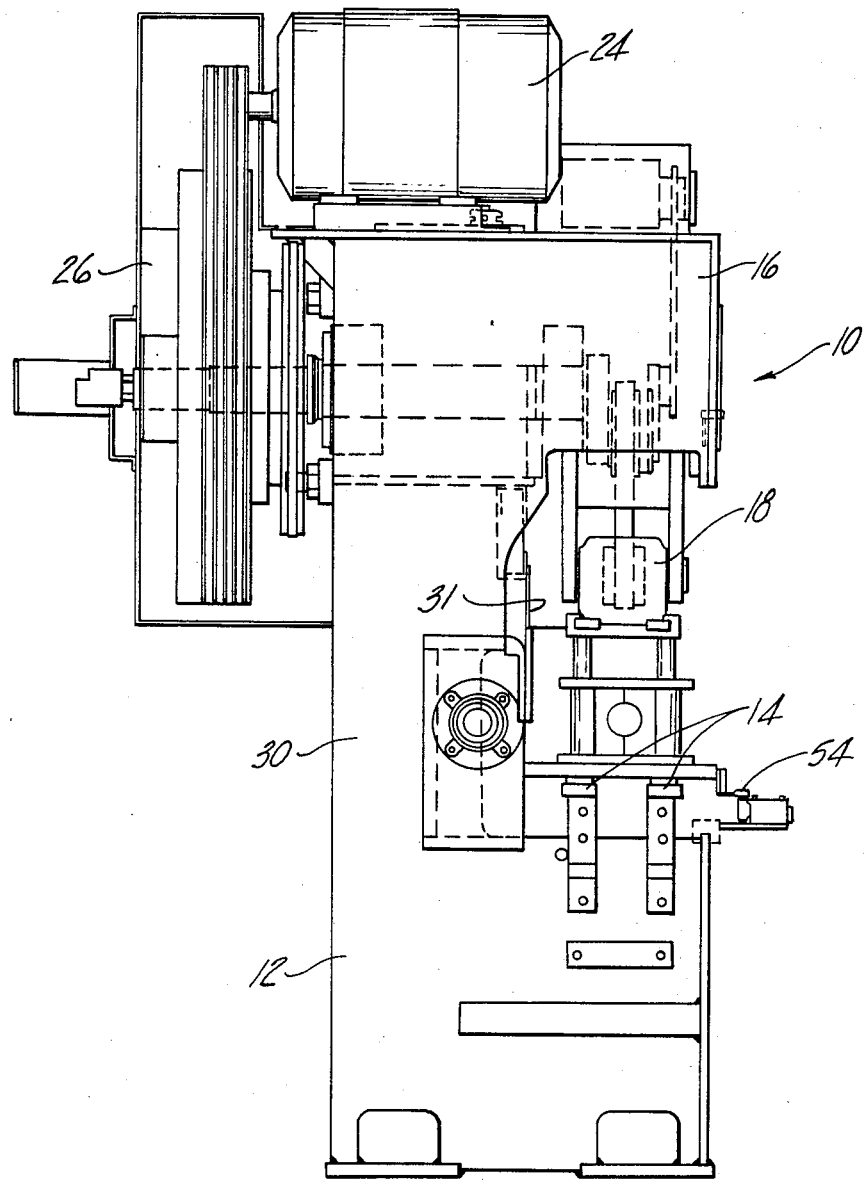
FIG. 2 is an end view of the machine of FIG. 1.

In accordance with the invention, the press 10 is shown to comprise side walls 30 which extend between and are effectively integral with the base 12 and the upper assembly 16. Mounted in side walls 30 are bearings 32 and 34 which receive a smooth shaft 36. At least bearing 32 is axially floating so as to accommodate about $\frac{1}{4}$ inch of longitudinal expansion of shaft 36 due to heating. The bearing seat is preferably spherical to reduce alignment difficulties. The shaft extends through the press 10 parallel to the rails 14, but, as best shown in FIG. 2, rearwardly or more internally of the press assembly and partially partitioned off by a panel 31 which extends downwardly from the upper assembly 16 so as to protect the shaft and associated mechanisms hereinafter described from the environment of the die mechanism 46. Shaft 36 is connected through a coupling 38 to a reversible DC motor 40 which is mounted on an outboard flange or pedestal 42 mechanically connected to the base 12.

Mounted on the shaft 36 is a traveler assembly 44 which travels longitudinally of the shaft as the shaft rotates. Traveler 44 is mechanically connected to the die mechanism 46 by plate 47 to cause the die mechanism to translate along the slide rails 14 as the shaft 36 is rotated by the motor 40.

The traveler 44 is a commercially available product comprising upper and lower assemblies which carry a plurality of pressure rollers which bear against the surface of shaft 36 and which are mounted at axis angles which are skewed relative to the axis of the shaft 36 such that a linear driving force and translation results from rotation of the shaft 36. The traveler 44, by virtue of its connection to the die mechanism 46 cannot rotate with the shaft 36 and, therefore, linear translation must occur. Because the rollers which form part of the traveler 44 and the surface of the shaft 36 are smooth, a bias force or clamping pressure is required to produce significant mechanical thrust to drive the die mechanism as a driven load. The connection between the traveler 44 and the shaft 36 is, however, subject to slip under overload conditions such as those which might occur in the presence of a mechanical obstruction in the area of the die mechanism due to a malfunction in the cutoff process.

Referring still to FIGS. 1 and 2, a mechanism for providing information regarding the absolute position of the die mechanism 46 relative to the press 10 and for controlling the motor 40 to maintain the die mechanism 46 between prefixed travel limits is shown. As previously stated, the mechanical relationship between the traveler 44 and the shaft 36 is such that slip may occur under abnormal conditions. Accordingly, it is not reliable to monitor the position of the die mechanism 46 exclusively according to the extent of rotation of the shaft 36 as may be possible in other more positive mechanical drive systems such as threaded shaft systems. Therefore, while an encoder 56 is provided on the motor 40 for generating pulses representing the estimated position of the traveler 44 and the die mechanism 46, an additional mechanism comprising rollers 47 and 48 mounted on side walls 30 is provided. Between the roller 47 and 48 and extending therearound is a trolley wire 50 the free ends of which are connected to the die mechanism 46 so that as the mechanism 46 translates back and forth between the walls 30 the trolley wire 50 causes the rollers 47 and 48 to rotate. Roller 48 is connected to an encoder 52 which produces pulses precisely indicating the position of the traveler 44 and the die mechanism 46. These pulses are applied to a counter 53 to indicate position as a function of the number of accumulated pulses. As will be apparent to those skilled in the art, a zero count may be equated with a home position and the counter 53 caused to count up in one direction and down in the other direction. A limit switch 54 mounted on the base 12 is provided as a redundant or full limit indicator for safety purposes. This limit switch may operate as an interlock with the motor 40 to automatically reverse the motor in the event the die mechanism 46 exceeds the limit of permissible travel in the positive direction.

Figure 3:
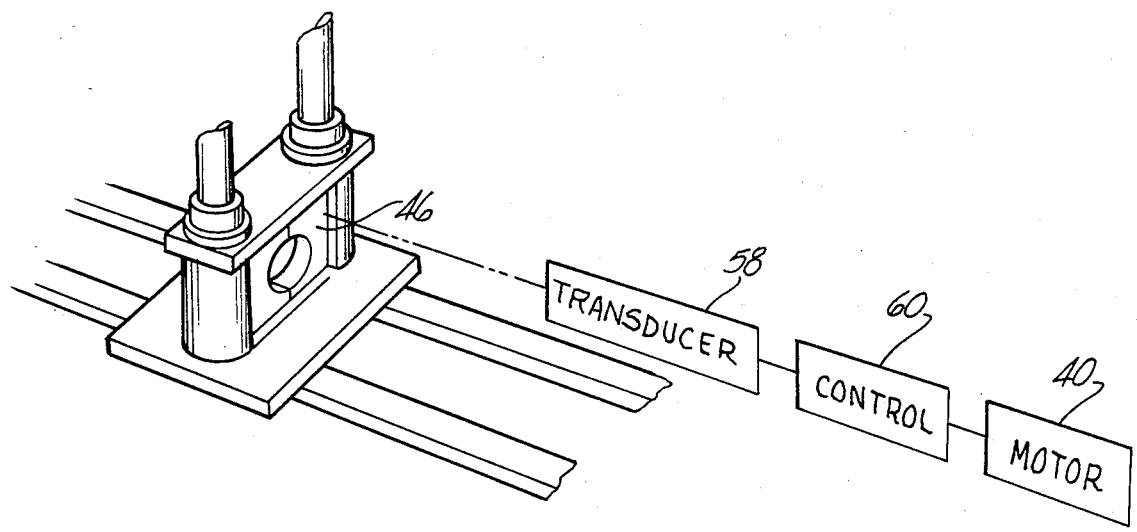
FIG. 3 is a perspective schematic view of a first control system.

FIG. 3 discloses an alternative embodiment of the die mechanism position indicator. In this embodiment, a sonic transducer 58 is mounted on the press 10 and aimed at the die mechanism 46 so as to produce a sonic transmission and echo signal in the manner of a radar set indicating the position of the die mechanism 46 relative to the press. The output of the transducer 58 is connected to a control circuit 60 which in turn is connected to the motor 40.

Figure 4:
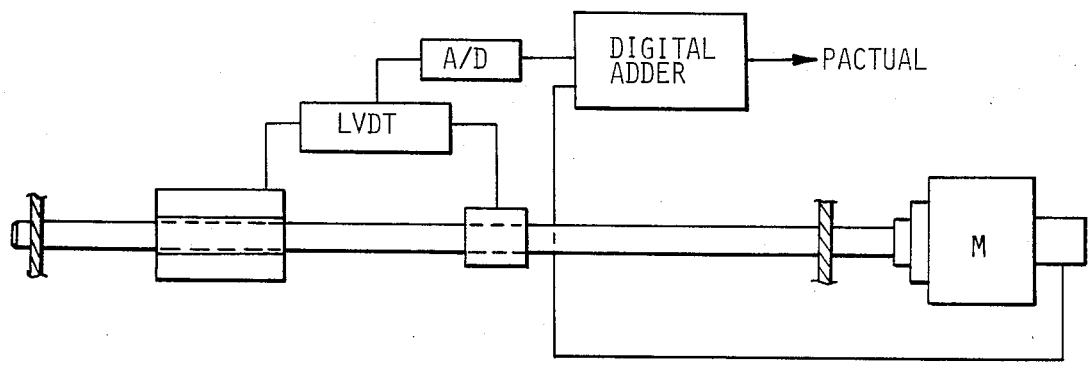
FIG. 4 is a schematic diagram of a second control system.

Referring now to FIG. 4, a still further embodiment of the position control system is shown. In FIG. 4, the drive nut or traveler 44 is mounted on a shaft 36 and is drivingly connected to the die mechanism as previously described. In addition, an unloaded or idler traveler 64 is also mounted on shaft 36 in spaced relationship to the drive traveler 44. The travelers 44 and 64 are nondrivingly interconnected by means of a relative position signal generator 66 such as a linear variable differential transformer (LVDT). As will be apparent to those skilled in the art, the LVDT comprises a hollow transformer winding which may in this case be connected to the idler traveler 64 and a ferrite core which moves within the transformer winding and, in this case, which is connected to the drive traveler 44. With the core in a central position relative to the transformer winding, a zero output is produced. As the core moves relative to the transformer due to slip in either direction between the travelers 44 and 64, a signal having a magnitude indicating the degrees of relative travel and a phase indicating the direction of relative travel is generated. This signal is applied to an analog to digital converter 68 which produces a change of position signal * P. This signal is connected to one input of a digital adder 70. The other input to the adder 70 is the pulse train produced by the encoder 56 connected to motor 40. The adder 70 is effective to arithmetically combine the estimated position signal with the change of position signal and produce an output representing at all times the actual position of the die mechanism 46 relative to the press 10.

While the invention has been described with reference to a press of the type generally used to cut tubing and roll-formed articles, it is to be understood that the invention may be applied to a wide variety of flying cutoff or flying stamping machines where it is essential to accelerate a mechanical device up to the speed of a traveling workpiece and monitor position of the mechanism at all times. The operator can also be, by way of example, a saw or a rotary cutoff. Similarly the invention is not limited to a press having a ram drive of the type shown in the drawings; to the contrary, the invention may be used with presses having air cylinder drives, electric motor drives, some of which are light enough to be mounted directly on and travel with the die mechanism, hydraulic drives, or other types of drives for the purpose of causing translation of a vertical cutting or stamping mechanism. These and many other modifications and additions to the specific embodiment disclosed herein will be apparent to those skilled in the art.

I claim:

1. An operator for linearly moving product such as tubing comprising:

a base having a bed; a die mechanism mounted on the bed for bidirectional travel along a path corresponding to the path of the product;

a reversable motor;

a threadless shaft connected to be rotated by said motor and extending along said base adjacent and parallel to the product path;

a traveler mounted on and drivingly connected to said shaft so as to travel linearly therealong as said shaft is rotated and mechanically connected to the die mechanism to drive the die mechanism along the product path;

means operative to allow slip in the driving connection between said traveler and said shaft in response to an overload condition associated with the die mechanism;

means for generating a signal represeting the absolute longitudinal position of said traveler relative to said bed; and control means operative to control the rotation of said motor in response to said signal.

2. An operator as defined in claim 1 wherein said means for generating a signal comprises a pulse-generating encoder having an input shaft the rotation of which actuates the encoder to produce pulses representing increments of shaft rotation, and means operative to rotate said encoder input shaft in response to movement of said traveler along the product path.

3. An operator as defined in claim 2 wherein said means to rotate said encoder input shaft includes roller means mounted on said base and a cord-like element connected to said traveler and extending over the roller means.

4. An operator as defined in claim 1 wherein said means for generating a signal comprises sonic transducer means mounted relative to the base and operatively associated with said traveler to produce a signal related to the absolute position of said traveler relative to said base.

5. An operator as defined in claim 1 wherein said means for generating a signal comprises means for producing a first signal representing the estimated position of said traveler as a function of motor rotation, means for producing a second signal representing slip between said traveler and said shaft, and means for arithmetically combining the first and second signals.

6. An operator as defined in claim 5 wherein said means for producing a second signal includes a second traveler mounted on said shaft to move linearly therealong, and means for monitoring the distance between the traveler associated with the die mechanism and said second traveler and producing a signal representing changes therein.

7. An operator as defined in claim 1 wherein said base further includes longitudinally spaced side walls, said shaft extends between said side walls, and bearing means are provided for rotatively mounting said shaft relative to said side walls.

8. An operator as defined in claim 7 further including partition means supported by said base and disposed between the die mechanism and said shaft.

9. An operator as defined in claim 7 wherein said bearing means allows limited longitudinal expansion of said shaft.

10. An operator as defined in claim 1 and further including a ram which is elongated in the direction of die mechanism travel and directly overlying the bed.

11. An operator as defined in claim 1 wherein said motor is a reversible D.C. motor.

* * * * *